United States Patent

[11] 3,545,710

[72] Inventor Paul C. Mooney
    Skokie, Illinois
[21] Appl. No. 739,795
[22] Filed June 25, 1968
[45] Patented Dec. 8, 1970
[73] Assignee Quick-Set Incorporated
    a corporation of Illinois

[54] CAM-HEAD STRUCTURE FOR CAMERA SUPPORT
    14 Claims, 8 Drawing Figs.
[52] U.S. Cl. .................................................. 248/183
[51] Int. Cl. ............................................... F16m 11/12
[50] Field of Search .......................................... 248/178,
    179, 184, 185

[56] References Cited
    UNITED STATES PATENTS
1,006,693  10/1911  Shaw ........................... 248/185
2,776,102  1/1957   Schlafly ....................... 248/178

FOREIGN PATENTS
807,555    1/1959   Great Britain ................. 248/183
1,123,300  6/1956   France ......................... 248/183
514,646    2/1955   Italy ........................... 248/178

Primary Examiner—Marion Parsons, Jr.
Attorney—Hofgren, Wegner, Allen, Stellman & McCord ABSTRACT: A device for supporting equipment in vertical tilting relationship without unbalancing the equipment relative to the device. A mechanical movement is provided which includes a pivoted link and a cam set for operatively maintaining a horizontal path of movement of the center of gravity of the equipment during tilting of the equipment through its prescribed arc of movement.

The mechanical movement is designed and constructed so as to maintain a substantially even balance throughout the full arc of vertical tilt movement. The type of equipment being supported can be TV cameras, movie cameras or projectors, gun mounts, optical equipment and the like.

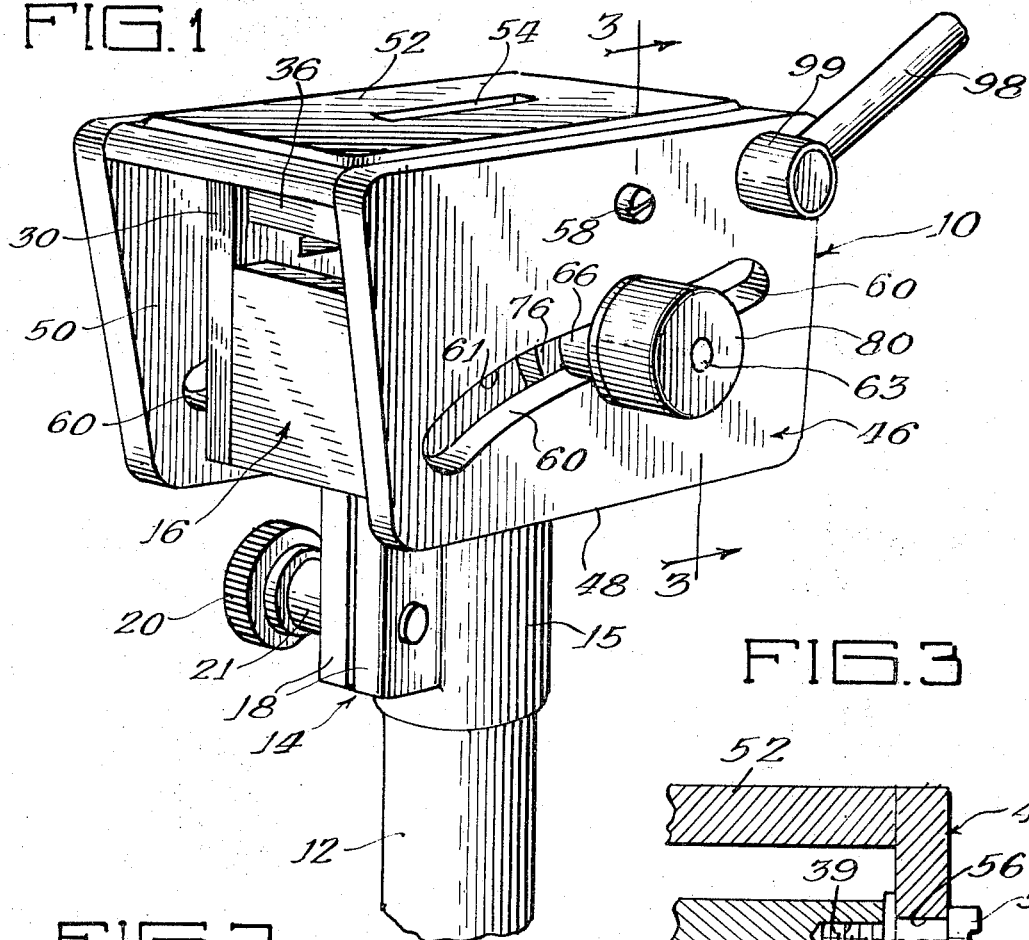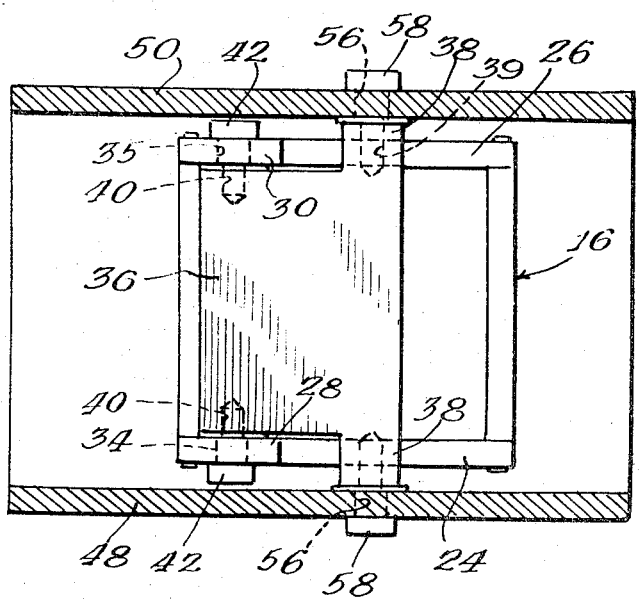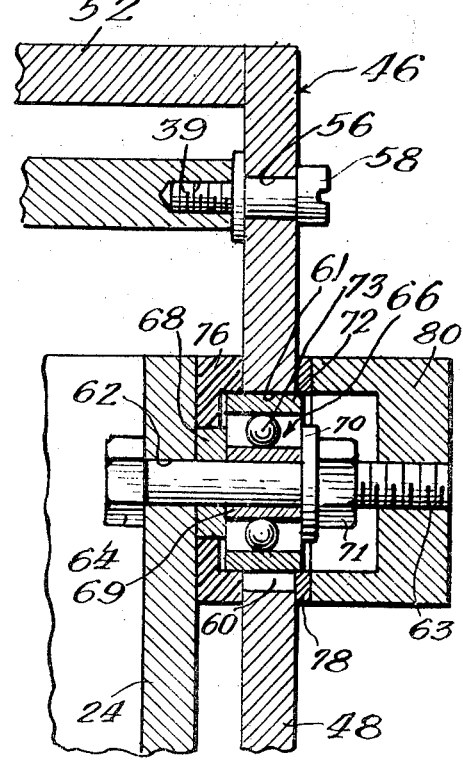

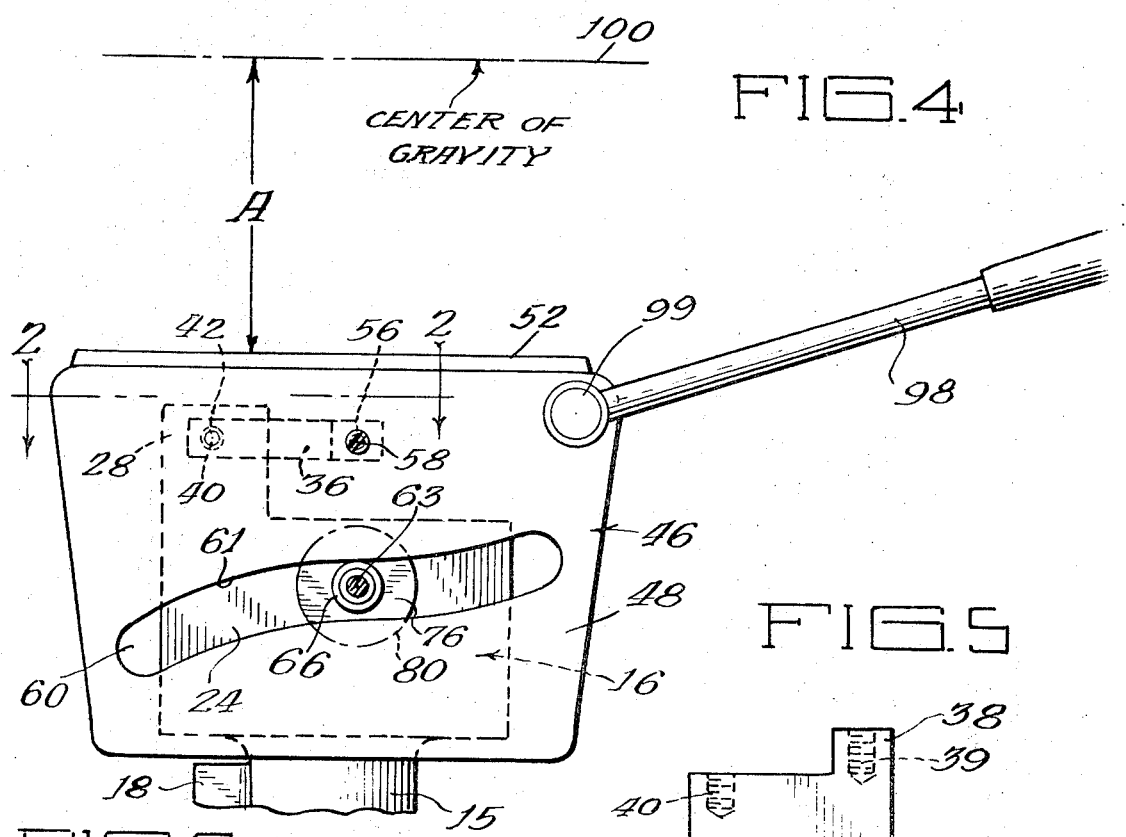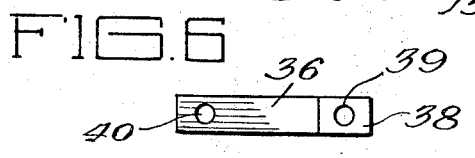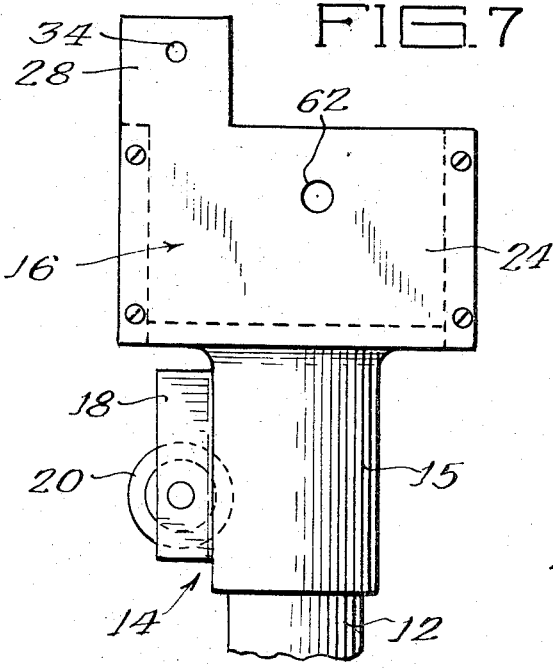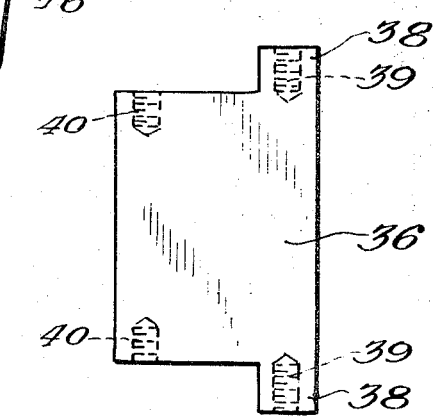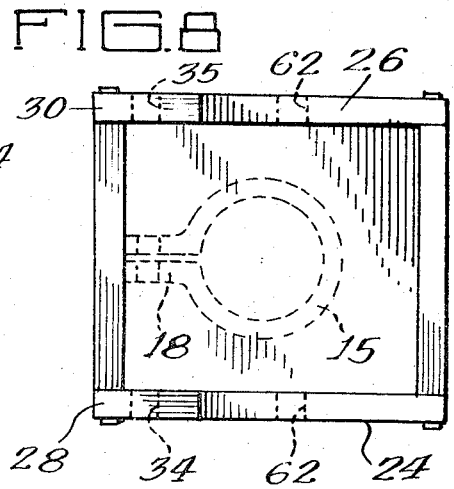

CAM-HEAD STRUCTURE FOR CAMERA SUPPORT

BACKGROUND OF THE INVENTION

1. Field of the Invention

This invention relates to a tilting support for equipment having a mechanical movement for producing a substantially balanced weight relationship for vertically tilting equipment.

2. Description of the Prior Art

Equipment supporting heads have been known and used for sometime. Most such heads are clamped on vertical posts on tripods, dollies, platforms and the like, such that loosening of a clamp will permit a part of the head with the equipment attached to be panned or pivoted in a horizontal plane about the axis of the post. In addition, means are provided whereby loosening of appropriate lock members will permit that part of the head with the equipment attached to be pivoted in a vertical plane about a fixed axis to produce what is known as vertical tilt to the equipment.

Since most equipment supported on the head is heavy, the minute the head is tilted forward or rearward a few degrees the center of gravity of the equipment passes a critical point and suddenly the weight of the equipment pitches the equipment and the head in the direction of movement under great and unexpected force often upsetting the supporting tripod, dolly or the like, or at the very least, banging the equipment when the head hits its limit stop. To then tilt the equipment to the desired position requires great force to lift the equipment against the unbalanced force of the equipment.

Even if the equipment does not pitch forward or backward when the center of gravity passes the critical point, it requires sudden exertion of great force to steady the equipment and pivot it to the proper tilt angle and lock it in that position. Even when locked in the tilt position, the unbalanced forces place a heavy strain on the locknuts holding the head in the tilt position such that frequently the equipment weight will slowly tilt the equipment even against the locking forces of said locknuts.

Some prior efforts have been made to overcome the unbalancing effect caused by the vertical tilting of the equipment by providing a concave surface in a base with which a concave surface on a tilting platform coincides such that as the two surfaces slide relative to each other, the equipment is maintained in reasonable balance. This system has proved to be unsatisfactory due to the problems of making and keeping the surfaces in matching relationship and the inability to supply reliable operative associated mechanisms.

British Pat. No. 807,555 published Jan. 14, 1959 to W. Vinten Limited attempted to overcome the unbalanced tilt forces by providing spaced apart vertical guides on the head, together with cams and cam followers guiding the equipment and the head as they are tilted to attempt to eliminate the pitching of the equipment in the direction of tilt. The British patent helped solve some of the problems, but the complexity of the British device, including the expense of providing and maintaining the special guides and bearings therefor, together with the instability created by the particular cam and follower arrangement has left much to be desired.

SUMMARY OF THE INVENTION

An equipment supporting head has been invented which not only overcomes the vertical tilt imbalance of the early devices mentioned hereinabove, but also eliminates expensive, complicated mounting and the binding and twisting instability of the above described prior art. The new head is completely operative, versatile, simple in construction and function, and considerably less expensive.

Specifically, by means of a novel combination of a mechanical movement in a supporting head, equipment mounted on the head can be moved through a wide range of vertical tilting movements with a minimum of effort. The center of gravity of the equipment is moved along a substantially horizontal path as the equipment is tilted through an arc of 90° or more without energy buildup. By maintaining the center of gravity of the equipment in a common horizontal plane, energy created by the weight of the equipment will not be permitted to move to a position to cause the equipment to pitch in the direction of movement thereof.

The details of construction and operation of the invention will now be more fully described and claimed, reference being had to the accompanying drawings forming a part hereof, wherein like numerals refer to like parts throughout, and in which:

BRIEF DESCRIPTION OF THE DRAWINGS

FIG. 1 is a perspective view of an equipment supporting head incorporating the invention therein;

FIG. 2 is an enlarged cross-sectional view taken along the line 2–2 of FIG. 4;

FIG. 3 is an enlarged cross-sectional view of the link pivot, cam set and locking arrangement taken on the line 3–3 of FIG. 1;

FIG. 4 is an elevational view of the supporting head showing its relationship with respect to the center of gravity of a piece of equipment to be mounted on the head;

FIG. 5 is a plan view of a link of the mechanical movement;

FIG. 6 is a side view of the link of FIG. 5;

FIG. 7 is an elevational view of the base support shown attached to a post; and

FIG. 8 is a top view of the base support of FIG. 7.

Referring to the drawings and, in particular, in FIG. 1, the reference numeral 10 refers to the equipment-supporting head incorporating the invention which is adapted to be attached to a post 12 by means of a clamp arrangement 14. The clamp arrangement 14 can be any one of many well-known types which permit the support head to be clamped to a stand of some sort and which clamp is adapted to be loosened so that the supporting head can be swung around or panned in the horizontal plane. As shown, the clamp arrangement 14 has a post encircling hub 15 downwardly depending from the base support 16 and has spaced flanges 18 which are adapted to be drawn together by the action of the thumb screw 20 and friction brake 21 which serve to grip the hub to the post 12.

The base support 16 has parallel sidewalls 24, 26, each of which has upstanding aligned ears 28, 30 with aligned openings 34, 35 formed therein. A link 36 has sidewardly projecting ears 38 outwardly extending from the opposite sides of the link and have threaded and aligned bores 39 formed therein. A second pair of aligned bores 40 having axes parallel to the axes of bores 39 are formed in the sides of the link 36 in spaced relationship thereto. A pair of headed pivot pins 42 pass through the openings 34, 35 in the walls 24, 26 of the base support 16 and into threaded relationship in the bores 40 in the link 36 such that the link can pivot about the axis of the pins 42 relative to the support 16.

An inverted U-shaped tilt table 46 is telescopically positioned over the base support 16 with the downwardly depending and parallel sidewalls 48, 50 of the tilt table being disposed substantially parallel to the sidewalls 24, 26 of the base support 16. The tilt table 46 has an equipment-supporting platform 52 extending between the sidewalls 48, 50. A slot 54 or similar attaching arrangement is provided in the platform 52 through which attaching means adapted to be extended for securing equipment to the platform of the tilt table. The specific manner in which the equipment is secured to the tilt table or supporting head does not form part of this invention.

A pair of aligned openings 56 are formed in the sidewalls 48, 50 of the tilt table through which pivot pins 58 project into engagement in the openings 39 in the ears of the link 36. In this way, the tilt table is free to pivot about the axis of the pins 58 and the link 36 is free to pivot about the axis of the pivots 42 passing through the base support 16.

An elongate lever or handle 98 is rigidly attached to the upper right-hand corner portion (as viewed in FIGS. 1 and 4) of the tilt table 46 through a hub 99 formed on the inner end portion of said handle 98. The handle 98 is fixed relative to the tilt table 46 in such a way that pressure up or down on the outer end of the handle will cause the tilt table to move therewith in the pattern dictated by the pivots on the link 36 and the cam sets to be hereinafter described.

The tilt table 46 has a pair of aligned slots 60 formed in the sidewalls 48, 50 which slots are shaped in a specially designed configuration providing a cam surface 61 along the top wall of each slot. The base support 16 has a pair of aligned openings 62 formed in the respective sidewalls 24, 26 which openings are in alignment with the midportion of the slots 60 in the walls 48, 50 of the tilt table 46 when the platform 52 of said tilt table is held parallel with the link 36. A cam roller spindle 63 which is threaded on both ends is positioned in each opening 62 and has a nut 64 threaded on the spindle and bearing against the inner wall of the base support 16. Each spindle 63 extends out through the aligned slot 60 and has a roller bearing or cam roller 66 positioned around said spindle 63. Specifically, the spindles 63 project from the walls 24, 26 and each has a washer 68 therearound which bears against the respective adjacent wall 24 or 26 and abuts against the inner raceway 69 of the ball bearing 66. A washer 70 and nut 71 are drawn up tight against the other side of the inner raceway 69 so as to fix the cam rollers or ball bearings 66 relative to the base support 16. Balls 73 are positioned between the inner and outer raceways 69, 72, respectively, so that the outer raceway is free to rotate relative to the inner raceway 69. The cam rollers 66 are located in the slots 60 in the tilt table with the outer raceways 72 engaging the cam surfaces 61 for rolling relationship therewith.

A friction locking means is provided on each side of the tilt table 46 which includes fiber friction washers 76 which are friction fit on the edge of the outer raceway 72 and have the friction surfaces facing the walls 24 or 26 of the base support and the inner surface of the walls 48 or 50. A second fiber friction washer 78 is fit onto the outer edge of the outer raceway 72 of each cam roller 66 and has one friction surface bearing against the outer surface of the walls 48 or 50 and has the other friction surface engaged by the inner face of a knurled locknut 80 threaded onto the spindle 63. When the lock heads or nuts 80 are tightened the friction washers 76 and 78 are tightly engaged between the respective surfaces of the walls of the base support and the tilt table to securely lock the tilt table in position relative to the base support.

As best illustrated in FIG. 4, the tilt table 46 is pivotally mounted to the link 36 by means of the pivots 58, and the link 36 is pivotally mounted to the base support 16 by the pivots 42. The cam rollers 66 are mounted on the spindles 63 having an axis fixed with respect to the base support 16. The cam rollers 66 engage with the cam surfaces 61 in the sides of the tilt table such that pressure up or down on the handle 98 causes the tilt table to follow a particular movement under the constraining movement of the link 36. The mechanical movement consisting of the link 36 with its fixed pivot axis 42 and its movable pivot axis 58 and the cam roller 66 with its fixed axis and cam surface 61 with its constantly moving axis combined in such a way that a piece of equipment mounted on the platform 52 of the tilt table 46 will have its center of gravity, which is located some distance above the platform, moved in a horizontal plane along a line perpendicular to a vertical axis. Starting with the platform horizontal as in FIG. 4, as force is applied downwardly on the handle 98, the cam surface 61 on the tilt table will roll to the left along the cam roller which will cause the link 36 to pivot in a counterclockwise direction around the pivot 42 so as to tilt the platform 52 to the rear and maintain the center of gravity in the plane designated 100 in FIG. 4 of the drawing. Likewise, raising the handle 98 will cause the cam surface 61 to roll to the right relative to the cam roller 66 and will likewise pivot the link 36 in a counter- clockwise direction around the axis of the pin 42 and will likewise maintain the center of gravity in the plane 100. The link 36 will pivot from the horizontal position of FIG. 4 in a counterclockwise direction during tilting in either a forward or a rearward direction and in each case will pivot in a clockwise direction as it moves back to the horizontal position.

By moving the center of gravity of the equipment in a horizontal plane relative to the supporting head, the forces or static energy created by the weight of the equipment attempting to tip the equipment about its mounting are minimized. The forces are those of gravity, the component in the link and the reaction on the cam which neutralize each other so as to maintain a high degree of balance. With the forces thus located, the equipment can be tilted without the need for the application of high forces on the handle 98. The equipment can be tilted to extreme angles of upward of 45° from the vertical without unbalancing the system and without requiring excessive forces on the handle 98 to control the movement of said equipment.

The location of the pivots for the link between the base support and the tilt table can be shifted to different points between said support and table, but for each set of locations of the pivots the design of the cam surface will vary so that the resulting movement of the center of gravity of the equipment and tilt table will be in a substantially horizontal plane.

The cam surface 61 is designed for use with a piece of equipment mounted on the tilt table with a center of gravity to be at a set distance above the platform 52 and in the specific form shown, is located on the vertical line lying perpendicular to the platform 52 and passing through the pivot axes 58 between the link 36 and the tilt table. When it is desired to mount equipment with a different center of gravity the tilt table 46 is easily removed and a new tilt table with an appropriately designed cam surface for the different center of gravity is installed in its place.

It is believed to be obvious that the cam surface 61 of the slot 60 is all that is needed since the lower wall of the slot has no function during tilting of the tilt table 46; however, a closed slot 60 has been incorporated as an aid in stabilizing the support head during removal and replacement of a piece of equipment on the platform. That is, once the attaching means have been disengaged between the platform and the piece of equipment, it is necessary to lift the equipment from the platform. Quite frequently the platform will stick to the equipment either due to the natural adhesion of two parts or due to the resistance set up between the detached attaching means. The sticking will have a tendency to lift the tilt head with the equipment. By means of the bottom wall of the slot engaging the cam roller, the resistance will be broken and the equipment removed without accidentally dismantling the support head.

A further advantage to the construction of the support head 10 lies in its rigidity and stability. The box shapes of the base support 16 and telescoping tilt table 46 which are linked together by four pivots in a solid rectangular shaped link 36 and the pair of cam rollers and slots provide a support head which cannot twist or bend under the load of the equipment attached thereto. The handle attachment to one corner portion of the tilt table will transmit moving forces directly to the pivot points and the cam set without twisting of the tilt table and the resulting binding caused thereby.

In use, with a piece of equipment mounted on the platform 52 the screw head 20 can be loosened and the support head and equipment can be horizontally panned to the desired degree. The screw head 20 is then tightened. The locking heads 80 are both loosened and one is retightened just enough to provide a drag on the tilting movement of the equipment. The head 80 that is set for dragging resistance is usually not manipulated further once it is set to the desired degree of drag. The equipment is next tilted to the desired degree and extend through pressure applied to the handle 98 whereupon the other locking head 80 is turned up tight to lock the tilt head in the proper angular position. Further manipulation in the tilt direction can be accomplished by operating the single lock head 80 with one hand as the other hand manipulates the handle 98.

The foregoing detailed description is given for clearness of understanding only and no unnecessary limitations are to be understood therefrom, as some modifications will be obvious to those skilled in the art.

I claim:

1. An equipment supporting head having plane tilting capabilities, comprising: a base support, a tilt table having means for attachment of equipment, a single link pivotally connecting the base support and the tilt table at fixed and spaced generally horizontal pivot center lines, and cam follower means engaging with cam surface means operatively connected between said base support and said tilt table, said single link being located in an area between said tilt table equipment attachment means and said cam follower and cam surface means whereby said tilt table is raised and lowered relative to the base support as the table pivots on said link to maintain the center of gravity of the table and equipment thereon moving substantially horizontally during such tilting movement.

2. A supporting head as claimed in claim 1 wherein said link constrains the table for movement about the axis of the pivots between the link and the base support.

3. A supporting head as claimed in claim 2 wherein said cam follower means and said cam surface means combine with the constraining movement caused by said link moving said center of gravity in said horizontal direction.

4. A supporting head as claimed in claim 1 wherein said cam follower means comprises at least one cam roller mounted on said base support and said cam surface means comprises at least one cam surface on said tilt table.

5. A supporting head as claimed in claim 4 wherein said tilt table has an equipment supporting platform and a pair of downwardly depending side portions, and said cam surface being formed in at least one of side portions.

6. A supporting head as claimed in claim 1 wherein means are provided for locking said tilt table to said base support in any desired position.

7. A supporting head as claimed in claim 6 wherein said locking means is located on said cam follower means and coacts with a surface adjacent the cam surface means such that tightening the locking means effects the locking action.

8. A supporting head as claimed in claim 1 wherein said link is a rectangularly shaped member and wherein the pivots for the link are formed in two opposite sides and lie on two common axes.

9. An equipment supporting head having upright plane tilting capabilities without energy buildup comprising: a base support, a cam follow on the base support with a generally horizontal cam sensing surface, a tilt table carried by the base support and having a downwardly facing portion with a cam surface bearing downwardly upon said cam follower, means on the tilt table for attachment of equipment, a link pivotally connecting the base support and the tilt table at spaced generally horizontal pivot center lines, said link being located in an area between said cam follower and said equipment attachment means on said tilt table, said link and cam bearing surface providing the only connections between the tilt table and base support, said cam bearing surface being shaped to raise and lower the tilt table relative to the base support as the table pivots on said link to maintain the center of gravity of the table and equipment thereon moving substantially horizontally during such tilting movement.

10. A supporting head as claimed in claim 9 having means for locking the tilt table relative to said base support.

11. A supporting head as claimed in claim 10 wherein said means includes a locknut on the shaft supporting said cam follower engaging the surface of the tilt head close to said cam surface whereby tightening the locknut locks the table to the support.

12. A cam head having a tilt table with capabilities of supporting equipment tilting same in an upright plane without substantially changing the required energy input to tilt from any relative position of tilt, comprising: a base support, a cam follower on the base support, a tilt table having a depending portion with a cam surface bearing downwardly upon the cam follower and transferring the weight of the table and equipment thereon to the follower, a positioning link being located in an area between said cam follower and an equipment attachment portion of said tilt table, said link pivotally connecting the base support and the table to require arcuate travel of the table about the pivot connection of the link to the base support during tilting movement, said cam surface being shaped to pivot the table about the end of the link attached to the table during such tilting movement to maintain the center of gravity of the table and equipment thereon traveling substantially horizontally without change in elevation.

13. A cam head as claimed in claim 12 and having means for locking said tilt table to said base support.

14. A cam head as claimed in claim 13 and having means for permitting the tilt table and base support to be panned in a horizontal plane.